US009165314B2

(12) United States Patent
Weskamp et al.

(10) Patent No.: US 9,165,314 B2
(45) Date of Patent: Oct. 20, 2015

(54) INTERACTIONS FOR SHARING CONTENT ITEMS IN A DIGITAL MAGAZINE

(71) Applicant: Flipboard, Inc., Palo Alto, CA (US)

(72) Inventors: Marcos A. Weskamp, Palo Alto, CA (US); Evan R. Doll, Menlo Park, CA (US); Didier Hilhorst, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 70 days.

(21) Appl. No.: 14/024,518

(22) Filed: Sep. 11, 2013

(65) Prior Publication Data

US 2014/0075339 A1    Mar. 13, 2014

Related U.S. Application Data

(60) Provisional application No. 61/700,307, filed on Sep. 12, 2012, provisional application No. 61/752,951, filed on Jan. 15, 2013, provisional application No. 61/752,952, filed on Jan. 15, 2013.

(51) Int. Cl.
*G06F 3/00* (2006.01)
*G06Q 30/02* (2012.01)
*H04L 29/06* (2006.01)

(52) U.S. Cl.
CPC ........ *G06Q 30/0269* (2013.01); *G06Q 30/0276* (2013.01); *H04L 65/403* (2013.01)

(58) Field of Classification Search
CPC .................................................. H04L 65/403
USPC ....................................................... 715/753
See application file for complete search history.

(56) References Cited

U.S. PATENT DOCUMENTS

| 8,230,075 | B1 * | 7/2012 | Weskamp et al. ............ 709/227 |
| 8,825,872 | B2 * | 9/2014 | Reisman ...................... 709/227 |
| 2005/0105134 | A1 | 5/2005 | Moneypenny et al. |
| 2008/0120670 | A1 | 5/2008 | Easton et al. |
| 2009/0049374 | A1 | 2/2009 | Echenberg |
| 2010/0049770 | A1 | 2/2010 | Ismalon |
| 2010/0299642 | A1 | 11/2010 | Merrell et al. |

(Continued)

FOREIGN PATENT DOCUMENTS

WO    WO 2010/132491 A2    11/2010

OTHER PUBLICATIONS

PCT International Search Report and Written Opinion for PCT/US2013/059302, Jan. 28, 2014, 11 Pages.

(Continued)

*Primary Examiner* — William Titcomb
(74) *Attorney, Agent, or Firm* — Fenwick & West LLP

(57) ABSTRACT

A digital magazine server user may identify a content item presented by the digital magazine server to save or present to other digital magazine server users by interacting with a client device presenting the content item. For example, providing a gesture to the client device identifies a content item for presentation to other digital magazine server users. The gesture may begin by the user interacting with a portion of a display device that displays a portion of the content item and continue as the user interacts with the display device along a path from the portion to an additional portion. When the gesture is completed, the user may be presented with options to present the content item to additional digital magazine server users, or the content item may be presented to other digital magazine server users.

24 Claims, 5 Drawing Sheets

(56) References Cited

U.S. PATENT DOCUMENTS

| | | | |
|---|---|---|---|
| 2011/0047368 A1 | 2/2011 | Sundaramurthy et al. | |
| 2011/0265011 A1 | 10/2011 | Taylor et al. | |
| 2011/0302064 A1 | 12/2011 | Dunkeld et al. | |
| 2012/0110678 A1 | 5/2012 | Kumble | |
| 2012/0192093 A1 | 7/2012 | Migos et al. | |
| 2012/0203640 A1 | 8/2012 | Karmarkar et al. | |
| 2012/0221555 A1 | 8/2012 | Byrne et al. | |
| 2012/0254188 A1 | 10/2012 | Koperski et al. | |
| 2012/0297490 A1 | 11/2012 | Barraclough et al. | |
| 2013/0021377 A1* | 1/2013 | Doll | 345/649 |
| 2013/0024757 A1* | 1/2013 | Doll et al. | 715/204 |
| 2013/0111395 A1* | 5/2013 | Ying et al. | 715/783 |
| 2014/0028685 A1* | 1/2014 | Weskamp et al. | 345/473 |
| 2014/0032635 A1* | 1/2014 | Pimmel et al. | 709/203 |
| 2014/0033134 A1* | 1/2014 | Pimmel et al. | 715/863 |
| 2014/0033202 A1* | 1/2014 | Weskamp et al. | 718/100 |
| 2014/0074934 A1* | 3/2014 | van Hoff et al. | 709/204 |
| 2014/0075289 A1* | 3/2014 | Brant | 715/234 |
| 2014/0075296 A1* | 3/2014 | Schaad et al. | 715/243 |
| 2015/0019957 A1* | 1/2015 | Ying et al. | 715/243 |
| 2015/0019958 A1* | 1/2015 | Ying et al. | 715/243 |

OTHER PUBLICATIONS

PCT International Search Report and Written Opinion for PCT/US2013/059297, Jan. 28, 2014, 15 Pages.

PCT International Search Report and Written Opinion for PCT/US2013/059298, Jan. 28, 2014, 15 Pages.

* cited by examiner

INTERACTIONS FOR SHARING CONTENT ITEMS IN A DIGITAL MAGAZINE

CROSS REFERENCE TO RELATED APPLICATIONS

This application claims the benefit of U.S. Provisional Application No. 61/700,307, filed Sep. 12, 2012, U.S. Provisional Application No. 61/752,951, filed Jan. 15, 2013, and U.S. Provisional Application No. 61/752,952, filed Jan. 15, 2013, each of which is incorporated by reference herein in its entirety.

BACKGROUND

This disclosure relates generally to digital magazines, and more specifically to interactions with content items included in a digital magazine.

Users often interact with content items provided by various sources, such as social networking systems, online publishers, and blogs. While a source typically allows a user to recommend or suggest content items to other users of the source, different sources have different mechanisms for presenting content items and for identifying content items to additional users. Thus, to identify content items to other users of different sources, a user must become familiar with various interfaces provided by each source. Additionally, the interaction options provided by these many sources are typically generalized, which often limits a user to performing certain limited actions when interacting with content items.

SUMMARY

A digital magazine is a personalized, customizable application for displaying content items to a user of a client device (e.g., a mobile communication device, tablet, computer, and any other suitable computing system). For example, a digital magazine server selects content items for presentation to a user based on the user's interests and preferences. The content items are sent with instructions for display to the user on a client device.

To allow the user to more easily save a content item or present a content item with additional users of the digital magazine server, a user interacts with a client device displaying the content item. In one embodiment, the user interacts with a portion of a display device in which the content item is displayed and interacts with the display device along a path from the portion to an additional portion. For example, the user contacts the portion of the display device and continues contacting the display device along the path from the portion to the additional portion. However, the user may identify a content item to save or to present to other digital magazine server users through other suitable techniques, such as: positioning a stylus or other object (e.g., a finger, a stylus pen, etc.) within a threshold distance above the surface of a portion of the display device where the content item is presented and traversing a path above the surface of the display device, positioning the stylus or other object within the threshold distance above the surface of the portion of the display device presenting the content item and traversing a path towards the surface of the display device, maintaining eye contact with the portion of the display device presenting the content item and maintaining eye contact with the display device along a path from the portion to the additional portion, and providing an audio command identifying the content item.

An instruction identifying the content item specified by the input is communicated to a digital magazine server, which sends one or more options for sharing the content item to the client device. The options are presented by the client device, allowing a user to select one or more of the options. For example, the options allow the user to specify a communication channel for presenting the content item to additional digital magazine server users or to identify users of the digital magazine server (or of another system) to receive the content item. An instruction to share the content item based on a selected object is communicated to the digital magazine server, which presents the content item to additional users based on the received instruction. Alternatively, the digital magazine server presents the content item to one or more additional digital magazine server users when the instruction identifying the content item is received. For example, information associated with the user specifies a communication channel and/or one or more additional users, and the digital magazine server presents the content item to the additional users using the specified communication channel.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
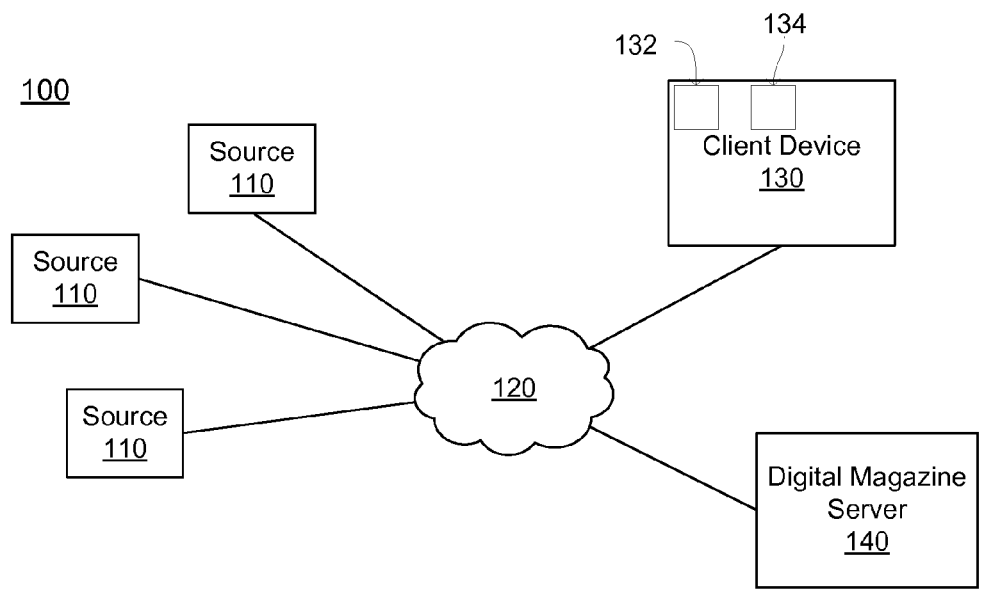
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
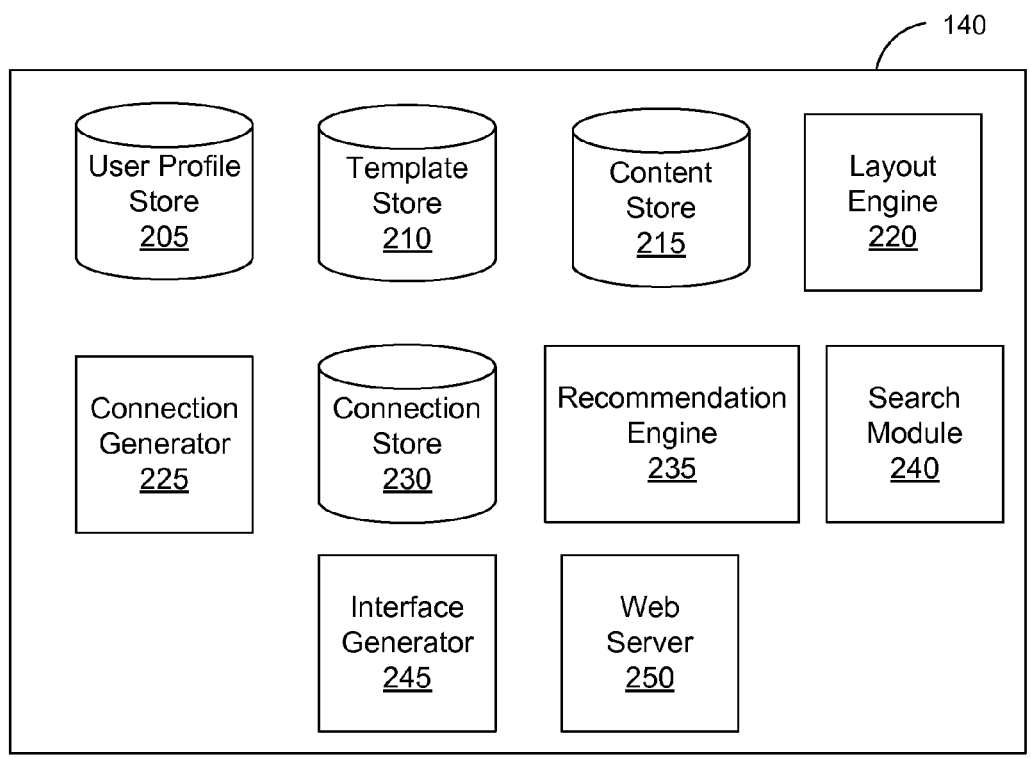
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 2Y links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, an application associated with the digital magazine server 140 identifies an input received by the client device 130 and communicates an instruction for sharing a content item determined by the input to the digital magazine server 140. In one embodiment, the application associated with the digital magazine server 140 identifies a content item based on an input received via the client device 130 and communicates an instruction to share the content item with one or more additional users to the digital magazine server 140.

Page Templates

Figure 3:
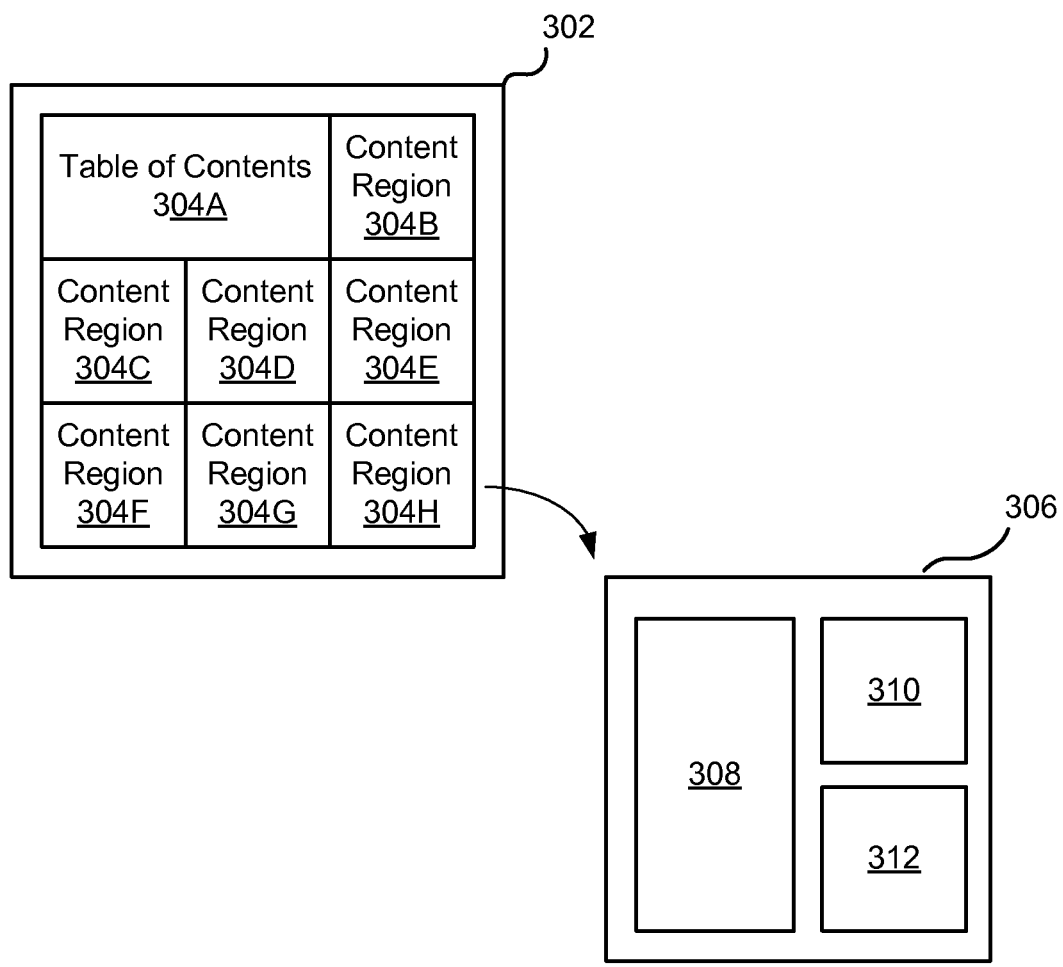
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Gestures for Sharing Content Items in a Digital Magazine

Figure 4A:
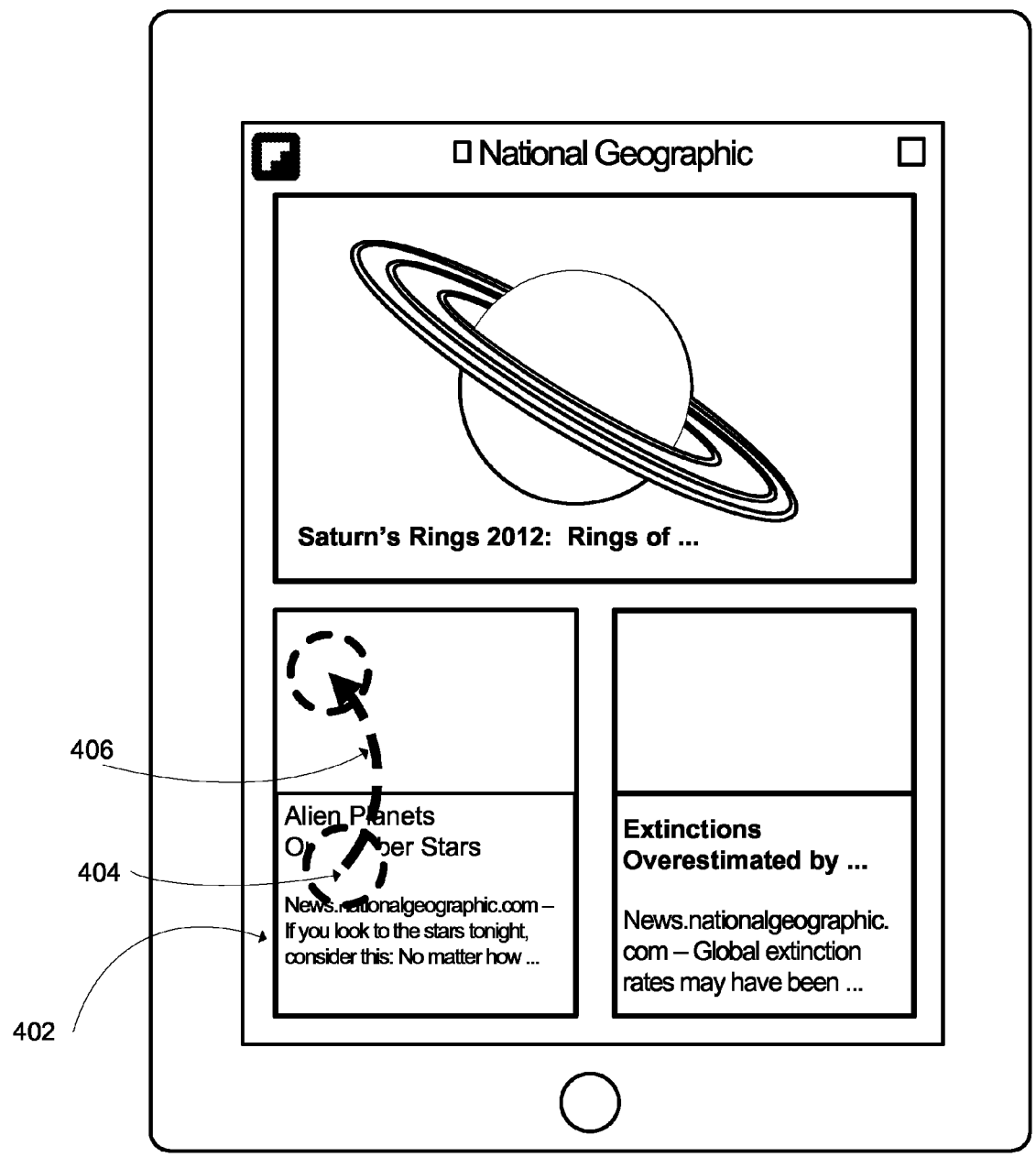
FIGS. 4A-4B are examples of content items presented to a user via a digital magazine presented by a display device on a client device, in accordance with an embodiment of the invention.
Figure 4B:
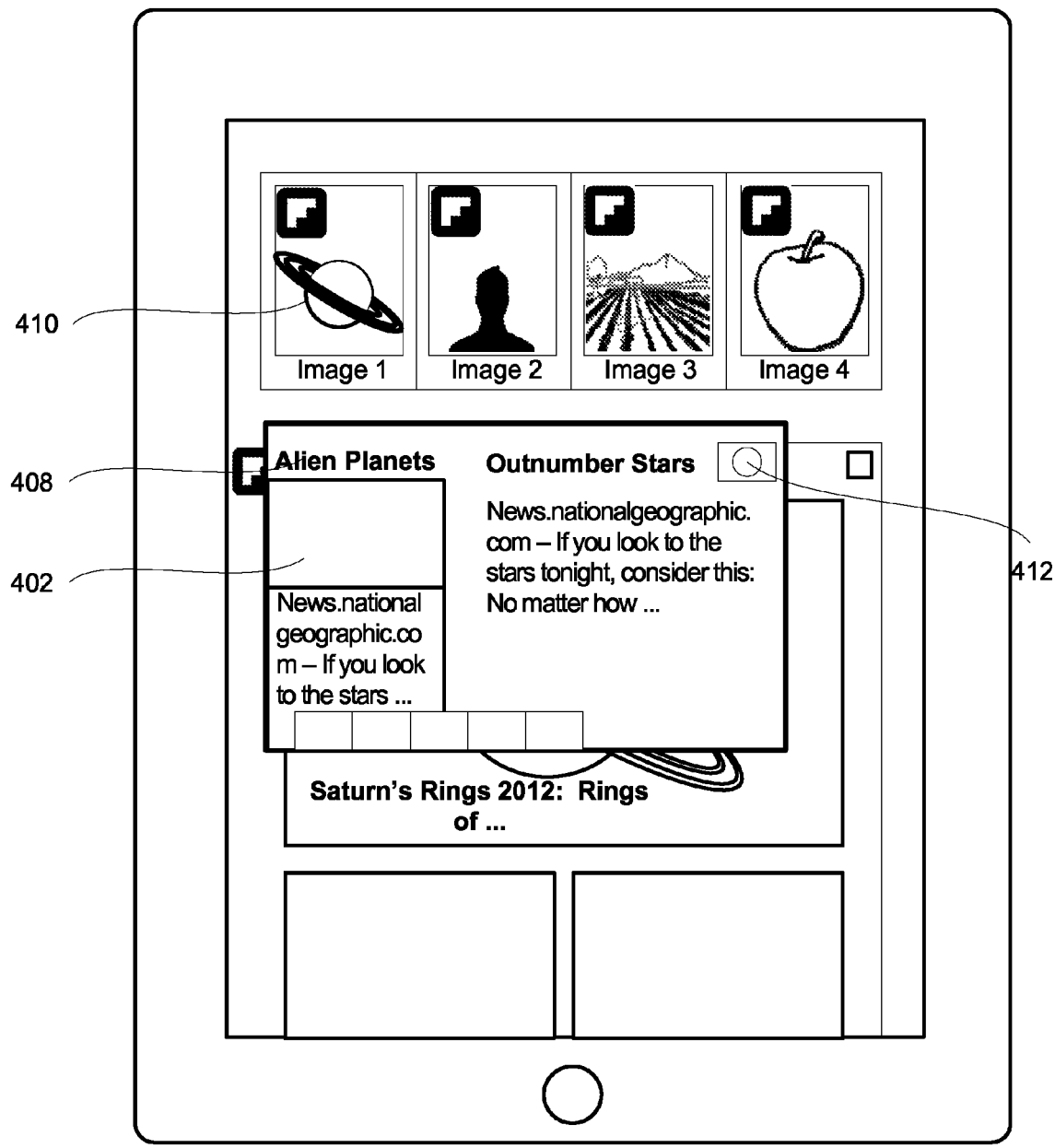

FIGS. 4A and 4B illustrate different views of an embodiment of content items presented to a digital magazine server user via a display device 132 of a client device 130. In the example of FIG. 4, the display device 132 is a touch-sensitive display. However, in other embodiments, the display device 132 includes one or more proximity sensors, one or more heat sensors, one or more resistive sensors, any other suitable types of sensors, and/or combinations of sensors. In one embodiment, a user interacts with a displayed content item 402 by interacting with the display device 132. For example, the user contacts a portion 404 of the display device 132 and continuously interacts with the display device 132 along a path 406 to provide an input.

In an embodiment where a touch-sensitive display device 132 is used, the user may provide the input by contacting a portion 404 of the display device 132 and maintaining contact with the display device 132 while traversing a path 406. The path 406 comprises moving from the portion 404 of the display device 132 towards an additional portion of the display device 132 in a direction of motion when an intermediate location, between the portion 404 and the additional portion, is reached. For example, one path 406 is moving from the portion 404 of the display device 132 to the additional portion of the display device 132 by moving upward towards and to the right of the additional portion and, at the intermediate location between the portion 404 and the additional portion, moving left of the portion 404. Other paths include additional intermediate locations between the portion and additional portion and additional directions of motion.

When the input is completed, an interface 408 displaying one or more options to the user is presented. For example, the options include an option to attach supplemental content to the content item 402 to a message sent to another user, an option to share the content item 402 with one or more additional users, an option to identify users to receive the content item 402, or other suitable options. In one embodiment, multiple options to share the content item 402 are presented, allowing the user to select from various communication channels (e.g., e-mail, social networking system, digital magazine server 140, text message, etc.) to share the content item 402. In an e-mail communication channel embodiment, the user is further prompted with a comment interface or the comment option in the interface 408. Additionally, the user may identify users of the digital magazine server 140, users of another system, such as a social networking system, a digital magazine maintained by the digital magazine server 140, or other suitable entities to receive the content item 402. Options for sharing a content item and interactions with the content item are further described below in conjunction with FIG. 5.

The interface 408 may present pop-up displays to assist the user in selecting recipients for the options. For example, if the user physically contacts the option for saving the content item 402, a pop-up display appears adjacent to the interface 408 in a row 410 and displays potential recipients for the content item 402, such as magazines as shown in FIG. 4. In another example, magazines or user identifiers are displayed or arranged in a different manner in the pop-up display. For example, the pop-up display is a scroll bar presented adjacent to the interface 408 and displays the possible recipients in a column.

In one embodiment, the displayed recipients are identified based on users, magazines, or other entities associated with the user. For example, when saving the content item 402, the recipients listed may be collections of content generated or maintained by the user. In other embodiments, the displayed recipients are determined based on attributes of the content item, attributes of the user, or any combination thereof.

After selecting one or more options, the user may manually complete interaction with the content item 402 by accessing an input element 412, such as a button, icon, or other graphical element. In other embodiments, rather than present one or more options to the user, the content item 402 is shared with one or more additional users or entities when the input is completed. For example, options for sharing the content item 402 are retrieved from a user profile associated with the user or from settings stored by an application executing on the client device 130 and associated with the digital magazine server 140. In another embodiment, the user identifies a collection of content items to which a content item is saved when an input is received by an application executing on the client device 130 and associated with the digital magazine server 140. Alternatively, one or more options for sharing the content item are determined based on attributes of the content item 402, attributes of the user, attributes of the input, or any combination thereof.

In an alternative embodiment, the path determines whether options are presented or actions are performed. One path may cause options to be sent from the digital magazine server 140 and other paths may cause different actions relating to the content item 402 to be performed. For example, a circular path saves the content item 402 to the digital magazine server 140, a triangular path corresponds to sharing the content item 402 with one or more users of the digital magazine server 140 and a diagonal path corresponds to commenting on the content item 402. The performed actions and paths can be retrieved from the user profile of the user or the settings of the application executing on the client device 130 in one embodiment.

Figure 5:
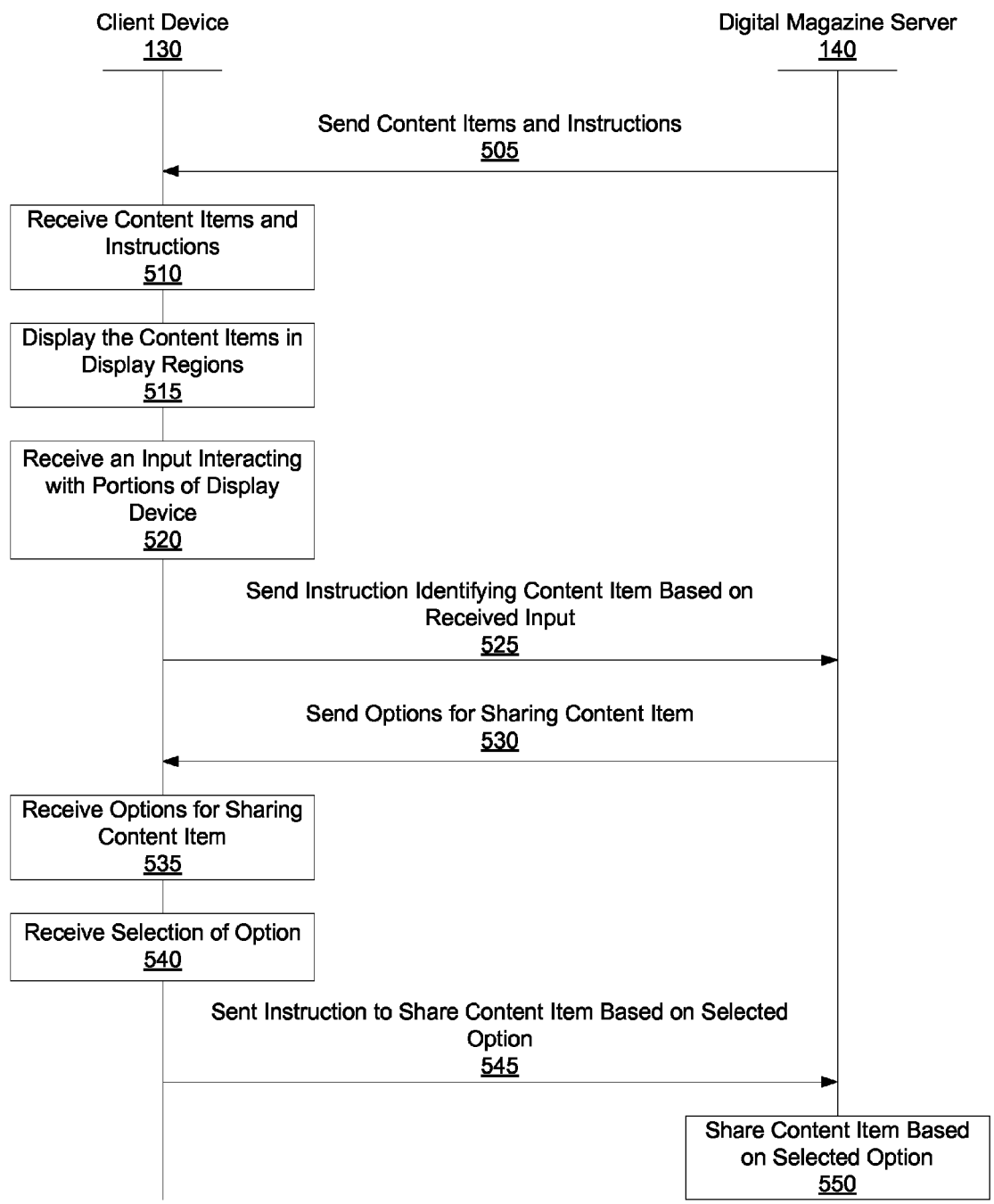
FIG. 5 is an interaction diagram of a method for interacting with content items included in a digital magazine, in accordance with an embodiment of the invention.

FIG. 5 illustrates an interaction diagram of a client device 130 and the digital magazine server 140 interacting with content items presented in a digital magazine or digital collection. In other embodiments, the methods may include different and/or additional steps than those shown in FIG. 5. The functionality described in conjunction with the client device 130 in FIG. 5 may be provided by the client device 130 or a digital magazine application executing on the client device 130 in various embodiments. The functionality described in conjunction with the digital magazine server 140 in FIG. 5 may be provided by the recommendation engine 235 in one embodiment or may be provided by any other suitable component or components in other embodiments.

The digital magazine server 140 sends 505 one or more content items and instructions for displaying the one or more content items to a client device 130, which receives 510 the content items and instructions. For example, the digital magazine server 140 sends 505 the one or more content items and instructions in response to a request for content items received from the client device 130, or may send 505 one or more content items and instructions for displaying the content items to the client device 130 at various time intervals. In one embodiment, the instructions for displaying one or more of the content items are retrieved from a digital magazine application executing on the client device 130, while the content items are received 510 from the digital magazine server 140, which retrieves the content items from the content store 215 or from one or more sources 110. Alternatively, the instructions may include page templates retrieved from the template store 210 of the digital magazine server 140 that describe relative positioning of content items to each other when displayed. As further described above in conjunction with FIGS. 2 and 3, the page templates have one or more slots specifying locations in which content items are displayed in a page of a digital magazine.

Based on the instructions, the client device 130 displays 515 one or more of the content items in various display regions of a display device 132 included on the client device 130. For example, content regions are displayed 515 in various positions in the display device 132 determined by slots in a page template. In one embodiment, the content items are displayed in a page of a digital magazine presented via the display device 132.

The client device 130 receives 520 an input from the user interacting with a portion of the display device 132 of the client device 130. For example, a display region presenting a content item is displayed in the portion of the display device 132. In one embodiment, the input is received 520 when the user interacts with the portion of the display device 132 and continues to interact with the display device 132 along a path from the portion to an additional portion of the display device 132. For example, if the display device 132 is a touch-sensitive display, the input is received 520 when the user contacts the portion of the display device 132 and maintains physical contact with the display device 132 from the portion to the additional portion of the display device 132. This interaction with the display device 132 allows the user to easily interact with a presented content item by performing a gesture with the display device 132.

In other embodiments, the input may be received 520 through other suitable methods. For example, the input is received 520 when the user contacts the portion of the display device 132 with a physical stylus and continues contacting the display device 132 with the physical stylus while traversing the path to the additional portion of the display device 132. Other examples of inputs received 520 include a user positioning a stylus or other object (e.g., a finger, a stylus pen, etc.) within a threshold distance above the surface of the portion of the display device 132 and traversing a path 406 above the surface of the display device 132, a user positioning the stylus or other object within the threshold distance above the surface of the portion of the display device 132 and traversing a path towards the surface of the display device 132, a sensor identifying eye contact by the user with the portion of the display device 132 and the user maintaining eye contact with the display device 132 along a path from the portion to the additional portion, receiving an audio command via an audio capture device, moving the client device 130 along a specified path, or any other suitable type of input. In an embodiment where the input is an audio command, the input is received 520 when a phrase or other audio signal with a specific signature is received by a microphone or other audio capture device included on the client device 130.

In one embodiment, the portion is an area of the display region in which a corner of the content item is displayed. In other embodiments, the portion and/or the additional portion display additional features of the content item. Examples of displayed features of the content item include one or more corners of the content item, a border, a title, a section, an image, a video, or a visual indication of a location such as a point, an icon, or a button. Alternatively, the additional portion includes a visual indication of a specific region of the display device, such as an icon, an image, a shape, or any other suitable data. For example, instead of the path shown by the dotted arrow in FIG. 4A, the path may be circular, where the portion and the additional portion are the same. Additional examples of a path include different shapes or patterns such as a rectangle, an ellipse, a triangle, an "x," a diagonal line, and a curved line.

When the input is received 520, the client device 130 sends 525 an instruction identifying the content item presented by the portion of the display device 132 with which the user interacted to the digital magazine server 140. In one embodiment, the instruction includes an identifier associated with the content item, such as a uniform resource locator (URL) associated with the content item; alternatively, a content identifier associated with the content item by the digital magazine server 140, or any other information identifying the content item, is included in the instruction. In various embodiments, additional information may be included in the instruction, such as one or more attributes of the content item. Example attributes of the content item include one or more of: a title, an author, a source, a type, a size, an identifier, and timestamp information.

When the digital magazine server 140 receives the instruction identifying the content item from the client device 130, the digital magazine server 140 sends 530 one or more options for sharing the content item with additional digital magazine server users to the client device 130. Various options may be sent 530, allowing the user to select from various communication channels to share the content item. Examples of options include: an option to attach supplemental content to the content item and send a message including the content item and the supplemental content to another digital magazine server user, an option to present the content item with one or more additional digital magazine server users (i.e., "share" the content item with one or more additional digital magazine server users), an option to display the content item in a location accessible to other digital magazine server users, an option to include the content item in a digital magazine provided by the digital magazine (e.g., a digital magazine associated with the user, a digital magazine associated with another user, a digital magazine globally accessible by digital magazine server users, etc), an option to generate a new digital magazine including the content item, and an option to identify users to receive the content item. However, other suitable options may be presented in various embodiments.

In some embodiments, the digital magazine server 140 selects options for sending 525 to the client device 130 based on a type of instruction received from the client device 130 or based on information describing the received input in the instruction received from the client device 130. For example, based on characteristics of the received input, the client device 130 selects from different instructions to send 525 or includes information describing the received input in the sent instruction. Example characteristics of the received input include: rate, force, direction, and duration. In one embodiment, if the instruction indicates that the input was completed in greater than a threshold time interval, one or more options for sharing the content item are selected by the digital magazine server 140 and sent 525 to the client device; however, if the instruction indicates that the input was completed in less than the threshold time interval, or in the threshold time interval, the instruction identifies the content item and the digital magazine server 140 shares the content item with one or more additional users based on settings associated with the user. In another embodiment, different types of inputs cause different instructions to be sent 525 to the digital magazine server 140, which may modify the options sent 530 by the digital magazine server 140 or the actions performed by the digital magazine server 140. For example, if the received input traverses the path one direction (e.g., clockwise), an action is performed by the digital magazine server 140 (e.g., share the content item), while if the received input traverses the path in a different direction (e.g. counter-clockwise) a different action (e.g., save the content item) is performed by the digital magazine server 140. Alternatively, the instruction sent 525 to the digital magazine server 140 is independent of characteristics of the received input.

In other embodiments, the options sent 530 to the client device 130 are selected based on information associated with the user by the digital magazine server 140. For example, information in the user's user profile or settings stored by an application executing on the client device 130 and associated with the digital magazine server 140 are used to select options for sending 530 to the client device 130. In other embodiments, the options are filtered by the digital magazine server 140 or by an application executing on the client device 130 and associated with the digital magazine server 140 based on attributes of the identified content item, attributes of the user, or any combination thereof. Example attributes of the identified content item include: a title, an author, a source 110, a type, a size, an identifier, and a topic. Examples of attributes of the user include preferences, prior interactions with content item, and additional users connected to the user.

The client device 130 presents the one or more options for sharing the content item received 525 to the user. For example, one or more of the received options are presented via an interface presented on the display device 132, such as the interface shown in FIG. 4B. This allows the user to select from various communication channels (e.g., e-mail, social networking system, digital magazine server 140, text message, etc.) to share the content item by selecting one or more of the presented options. If the user interacts with a presented option, one or more additional options may be presented. For example, if the user interacts with an option to attach supplemental content to the item, the user may be presented with options for identifying supplemental content to attach, such as other content items maintained by the digital magazine server 140, content items maintained by systems other than the digital magazine server 140, comments, audio data, text data, or any other suitable content.

Additionally, the presented options allow the user to identify additional users to receive the content item. For example, the user may identify itself, other users of the digital magazine server 140, users of a system other than the digital magazine server 140 (e.g., a social networking system), a digital magazine maintained by the digital magazine server 140, or other suitable entities to receive the content item.

When the client device 130 receives 540 a selection of an option, an instruction to share the content item based on the selected option is sent 545 to the digital magazine server 140. For example, the user accesses an input element associated with an option to select the option, and an instruction identifying the selected option is sent 545 to the digital magazine server 140. The input element may be a button, an icon, or other graphical element. Based on the instruction to share the content item, the digital magazine server 140 shares the content item 550 by presenting it to one or more additional digital magazine server 140 users or presenting in to users of a system coupled to the digital magazine server 140. The selected option identified by the instruction specifies a communication channel and/or one or more users to be presented with the content item. In some embodiments, the digital magazine server 140 shares 550 the content item when the instruction identifying the content item is received, allowing the content item to be shared 550 without the user selecting an option for sharing the content item.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for interacting with content items included in a digital magazine, the method comprising:
    receiving one or more content items from a digital magazine server and instructions for displaying the content items on a client device to a user of a digital magazine server;
    displaying the one or more content items in display regions of a display device included on the client device;
    receiving an input from the user interacting with a portion of the display device of the client device corresponding to a display region presenting a content item and continuously interacting with the display device along a path from the portion of the display device of the client device to an additional portion of the display device of the client device;
    responsive to the received input, sending an instruction identifying the content item presented by the portion of the display device corresponding to the display region with which the user interacted to the digital magazine server;
    receiving one or more options from the digital magazine server for sharing the content item presented by the portion of the display device corresponding to the display region with which the user interacted with one or more additional users of the digital magazine server;
    receiving a selection of an option for sharing the content item presented by the portion of the display device corresponding to the display region with which the user interacted; and
    sending an instruction to the digital magazine server to share the content item presented by the portion of the display device corresponding to the display region with which the user interacted to one or more additional users of the digital magazine server based on the selected option.

2. The method of claim 1, wherein the instructions sent from the digital magazine server identify the relative positioning of content items when displayed.

3. The method of claim 1, wherein the display device comprises one or more eye-tracking cameras.

4. The method of claim 1, wherein the display device comprises one or more proximity sensors, one or more heat sensors, one or more resistive sensors, and any combination thereof.

5. The method of claim 1, wherein the input from the user comprises an eye movement, an interaction with a stylus, a physical contact with the display device, a contactless hover with the display device, and any combination thereof.

6. The method of claim 1, wherein the portion of the display device comprises a region of the display corresponding to a corner of the content item.

7. The method of claim 6, wherein the additional portion of the display device comprises a visual indication of a specific region of the display device.

8. The method of claim 7, wherein the visual indication of the specific region of the display device comprises: an image, an icon, a shape, and any combination thereof.

9. The method of claim 1, wherein continuously interacting with the display device comprises maintaining physical contact with the display device using a physical stylus, maintaining proximity with the display device using a physical stylus, maintaining eye contact with the display device, and any combination thereof.

10. The method of claim 1, wherein the path comprises moving from the portion of the display device to the additional portion of the display device by moving upward towards and to the right of the additional portion and, at an intermediate location between the portion and the additional portion, moving left of the portion.

11. The method of claim 1, wherein the instructions sent to the digital magazine server responsive to the received input include an identifier associated with the content item.

12. The method of claim 1, wherein the options for sharing are selected from a group consisting of: an option to provide a comment associated with the content item, an option to post the content item for presentation to additional users of the digital magazine server, an option to indicate a preference for the content item, an option to save the content item to the digital magazine server, an option to include the content item in a communication stream, an option to email the content item, and any combination thereof.

13. The method of claim 12, wherein the option to post the content item for presentation to additional users of the digital magazine serve comprises: an option to include the content item in a feed presented by a social networking system coupled to the digital magazine server.

14. The method of claim 1, wherein the options for sharing comprise of posting the content item on a location accessible by one or more additional users and non-users of the social networking system.

15. A computer program product comprising a non-transitory computer-readable storage medium containing computer program code for interacting with content items included in a digital magazine, the method comprising:
    receiving one or more content items from a digital magazine server and instructions for displaying the content items on a client device to a user of a digital magazine server;
    displaying the one or more content items in display regions of a display device included on the client device;
    receiving an input from the user interacting with a portion of a display device of the client device corresponding to a display region presenting a content item and continuously interacting with the display device along a path from the portion of the display device of the client device to an additional portion of the display device of the client device;

responsive to the received input, sending an instruction identifying the content item presented by the portion of the display device corresponding to the display region with which the user interacted to the digital magazine server;

receiving one or more options from the digital magazine server for sharing the content item presented by the portion of the display device corresponding to the display region with which the user interacted with one or more additional users of the digital magazine server;

receiving a selection of an option for sharing the content item presented by the portion of the display device corresponding to the display region with which the user interacted; and sending the instruction to the digital magazine server to share the content item presented by the portion of the display device corresponding to the display region with which the user interacted to one or more additional users of the digital magazine server based on the selected option.

16. The computer program product of claim 15, wherein the options for sharing are selected from a group consisting of: an option to provide a comment associated with the content item, an option to post the content item for presentation to additional users of the digital magazine server, an option to indicate a preference for the content item, an option to save the content item to the digital magazine server, an option to include the content item in a communication stream, an option to email the content item, and any combination thereof.

17. The computer program product of claim 16, wherein the option to post the content item for presentation to additional users of the digital magazine serve comprises: an option to include the content item in a feed presented by a social networking system coupled to the digital magazine server.

18. The computer program product of claim 15, wherein the options for sharing comprise of posting the content item on a location accessible by one or more additional users and non-users of the social networking system.

19. A method for interacting with content items included in a digital magazine, the method comprising:

sending one or more content items from the digital magazine and instructions for presenting the content items to a client device for presentation to a user of a digital magazine server;

receiving an instruction identifying a content item from the client device, the content item identified responsive to the user interacting with a portion of a display region of the client device presenting the content item and continuously interacting with the display region of the client device along a path from the portion of the display region to an additional portion of the display region of the client device; and sending one or more options for sharing the content item identified by the instruction with one or more additional users of the digital magazine server.

20. The method of claim 19, wherein the options for sharing are selected from a group consisting of: an option to provide a comment associated with the content item, an option to post the content item for presentation to additional users of the digital magazine server, an option to indicate a preference for the content item, an option to save the content item to the digital magazine server, an option to include the content item in a communication stream, an option to email the content item, and any combination thereof.

21. The method of claim 20, wherein the option to post the content item for presentation to additional users of the digital magazine serve comprises: an option to include the content item in a feed presented by a social networking system coupled to the digital magazine server.

22. The method of claim 20, wherein the options for sharing comprise of posting the content item on a location accessible by one or more additional users and non-users of the social networking system.

23. A method for interacting with content items included in a digital magazine, the method comprising:

receiving one or more content items from a digital magazine server and instructions for displaying the content items on a client device to a user of a digital magazine server;

displaying the one or more content items in display regions of a display device included on the client device;

receiving an input from the user interacting with a portion of the display device of the client device corresponding to a display region presenting a content item and continuously interacting with the display device along a path from the portion of the display device of the client device to an additional portion of the display device of the client device;

responsive to the received input, sending an instruction identifying the content item presented by the portion of the display device corresponding to the display region with which the user interacted to the digital magazine server to share the content item to one or more collections on the digital magazine server.

24. The method of 23, wherein a collection the content item is shared to is selected based on at least in part on one or more of: attributes of the content item, information associated with the user by the digital magazine server, information associated with additional users of the digital magazine server that interacted with the content item, and any combination thereof.

* * * * *